United States Patent [19]
Willmann et al.

[11] Patent Number: 5,278,715
[45] Date of Patent: Jan. 11, 1994

[54] SCANNING DEVICE FOR MAGNETIC TAPE WITH SPECIAL DISPOSITION OF ROTARY TRANSFORMERS FOR RECORDING AND PLAYBACK MAGNETIC HEADS

[75] Inventors: Hartmut Willmann, Gross-Zimmern; Gerhard Falk, Rossdorf, both of Fed. Rep. of Germany

[73] Assignee: BTS Broadcast Television Systems GmbH, Darmstadt, Fed. Rep. of Germany

[21] Appl. No.: 832,935

[22] Filed: Feb. 10, 1992

[30] Foreign Application Priority Data

Feb. 13, 1991 [DE] Fed. Rep. of Germany ....... 4104264

[51] Int. Cl.$^5$ .......................... G11B 5/52; G11B 15/61
[52] U.S. Cl. ................................. 360/108; 360/130.24
[58] Field of Search .................... 360/108, 130.24, 107, 360/84

[56] References Cited

U.S. PATENT DOCUMENTS

| | | | |
|---|---|---|---|
| 4,080,639 | 3/1978 | Gunschmann | 360/130.24 |
| 4,156,261 | 5/1979 | Wolf | 360/109 |
| 4,654,738 | 3/1987 | Kato et al. | 360/108 |
| 4,706,143 | 11/1987 | Asada et al. | 360/130.24 |
| 4,706,144 | 11/1987 | Asada et al. | 360/130.24 |
| 4,961,122 | 10/1990 | Sakai et al. | 360/130.24 |

FOREIGN PATENT DOCUMENTS

| | | | |
|---|---|---|---|
| 3342493C2 | 5/1984 | Fed. Rep. of Germany | H04N 5/782 |
| 62-67702 | 3/1987 | Japan | 360/130.24 |
| 62-82501 | 4/1987 | Japan | 360/130.24 |
| 1-312702 | 12/1989 | Japan | 360/130.24 |
| 2-9003 | 1/1990 | Japan | 360/130.24 |

*Primary Examiner*—John H. Wolff
*Assistant Examiner*—Craig A. Renner
*Attorney, Agent, or Firm*—Frishauf, Holtz, Goodman & Woodward

[57] ABSTRACT

For oblique track scanning of magnetic tape which is looped around a two-part drum (1, 2) separated by a gap (5) in which magnetic heads (11) affixed to a headwheel revolve, the rotary transformers connecting the magnetic heads on the headwheel to fixed parts of the scanning device are provided by inner and outer magnetic core rings in which windings are embedded for a number of transformers. One group of these rotary transformers (18, 19) is located above the headwheel disk structure (10, 25) in such a way that outer magnetic core rings are fixed in a bore of the fixed upper drum (1) and inner magnetic core rings (19) are affixed to a seating shell (25) that connects the headwheel disk (10) to its driving shaft. Another group of rotary transformers (10, 21) is located beneath the rotary headwheel disk structure (10, 25) and in this case the outer magnetic core rings (20) are affixed to the inner wall of the rotary headwheel disk structure (10, 25) and the inner magnetic core rings are affixed to the outer wall of the bearing (15) of the shaft (14) that drives the rotary headwheel disk.

7 Claims, 2 Drawing Sheets

SCANNING DEVICE FOR MAGNETIC TAPE WITH SPECIAL DISPOSITION OF ROTARY TRANSFORMERS FOR RECORDING AND PLAYBACK MAGNETIC HEADS

CROSS REFERENCE TO RELATED PATENT

U.S. Pat. No. 5,212,610 to Gerhard Falk, Hartmut Willmann and Wolfgang Fell, issued May 18, 1993.

This invention concerns a scanning device for oblique tracks on a magnetic tape of the kind that has a two-part tape guiding drum consisting of fixed upper and lower drums separated by a gap, a rotary headwheel disk rotating with a shaft and having at least two magnetic heads affixed to its periphery and at least two rotary transformers for supplying signals to and passing on signals from the magnetic heads. In such a scanning device it is useful to have some of the rotary transformers above the headwheel disk and others of them below the headwheel disk, each rotary transformer consisting of a fixed part and a rotary part.

BACKGROUND AND PRIOR ART

A scanning device is known in which a two-part tape-guiding drum is provided and in which a rotary headwheel disk is in the gap between the two parts of the drum. At the periphery of the headwheel disk two magnetic heads are affixed. The signal transmission from and to these magnetic heads takes place over planar rotary transformers. One of the planar rotary transformers is located at the upper side of the rotary drum and the other is located at the underside of the rotary drum. Such a scanning device, however, is suitable only for recording and playback of relatively narrowband signals.

For recording and reproduction of broadband digital signals at a data transmission rate greater than 1 gigabit per second, the data stream is subdivided for transmission simultaneously over several channels. In order to limit the circuit expense resulting from the subdivision it is desirable that the individual rotary transformers all have the same signal transmission properties. In such a case the frequency bandwidth should accomodate a data rate above 100 megabits per second and the signal to noise margin between the individual rotary transformers should be greater than 80 dB.

Known devices with a number of planar rotary transformers (DE 33 42 493 C2) do not satisfy these requirements, because the individual transformer windings are concentrically disposed at different radii and the signal to noise margin is insufficient.

Another known kind of embodiment (DE 26 09 335 A1 and U.S. Pat. No. 4,156,261), in which the individual rotary transformers are constructed with two magnetic core rings which are disposed one above the other, has the disadvantage that the signal to noise margin, especially for rotary transformers used respectively for recording and playback, is insufficient to meet the above-mentioned requirements. There is also the further disadvantage that replacement of the headwheel disk after wearing away of the magnetic heads is expensive.

SUMMARY OF THE INVENTION

It is an object of the present invention to provide a scanning device of the general kind above described, in which particular components of the scanning device are improved with respect to signal crosstalk and replaceability.

Briefly, rotary transformers are used which in each case have an outer magnetic core ring with embedded windings and an inner magnetic core ring concentric thereto with embedded windings and are arranged pairwise, one pair above the other, in such a way that those of the rotary transformers which are located above the headwheel disk have the outer magnetic core rings fixed in a bore of the fixed upper drum and the inner magnetic core rings are on a seating shell connecting the shaft to the rotary headwheel disk, while in the case of the remainder of the rotary transformers, which are located below the headwheel disk, the outer magnetic core rings are affixed to the inner wall of a bearing for the rotary headwheel disk and the inner magnetic core rings are affixed to an outer wall of a bearing for the shaft of the rotary headwheel disk.

The scanning device of the invention has the advantage that by spatial separation into playback and recording transformer groups, on the one hand the signal to noise margin between the rotary transformers is improved and, on the other hand, a compact scanning device structure results which can in a simple manner be disassembled for maintenance or service. In addition, the scanning device of the invention has the advantage that by special disposition of the magnetic core rings between a drum half and the headwheel disk, the shaft driving the headwheel disk can be mounted in a bearing at the height of the orbit of the rotating magnetic heads. Further details and advantages are described below.

DRAWINGS

The invention is further described by way of illustrative example with reference to the annexed drawings, in which:

FIG. 1 is a side view, with the left portion in section as well as a portion at the extreme right, of a scanning device of the present invention in assembled state, and FIG. 2 is a side elevation like that of FIG. 1, partly in section, of the same scanning device according to the invention in a disassembled or exploded representation.

DESCRIPTION OF THE ILLUSTRATED EMBODIMENTS

Figure 1:
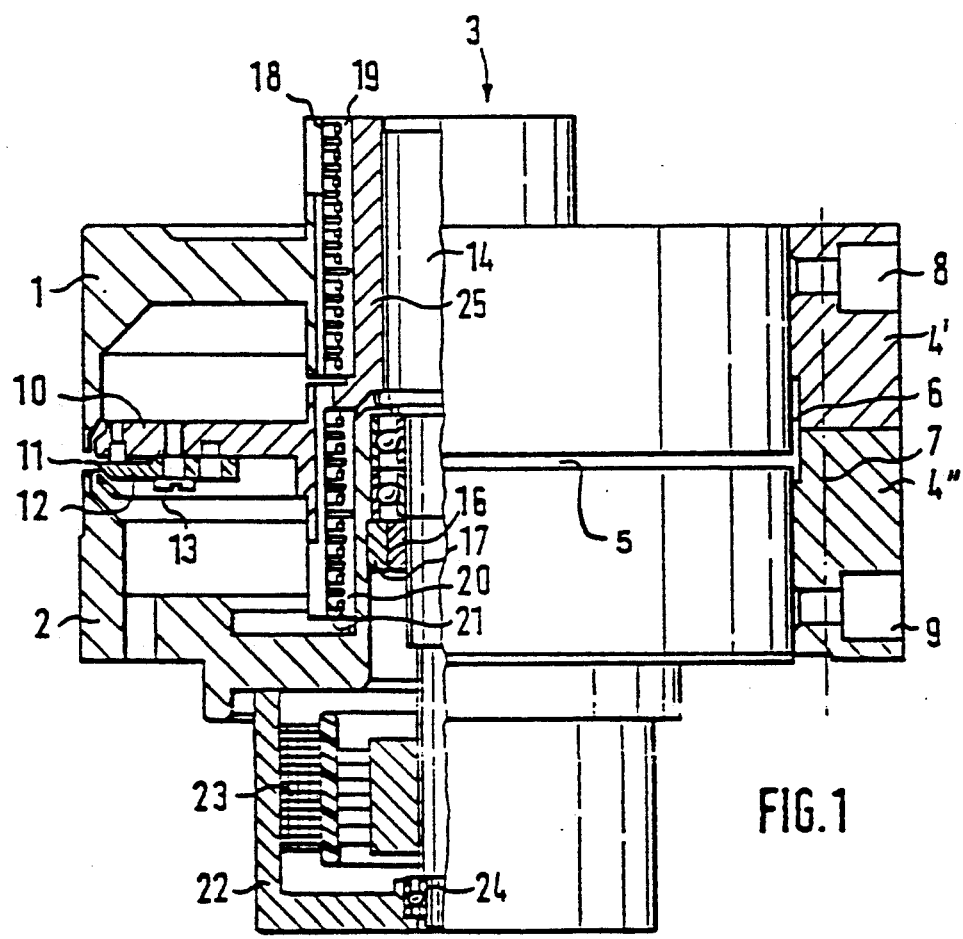
Figure 2:
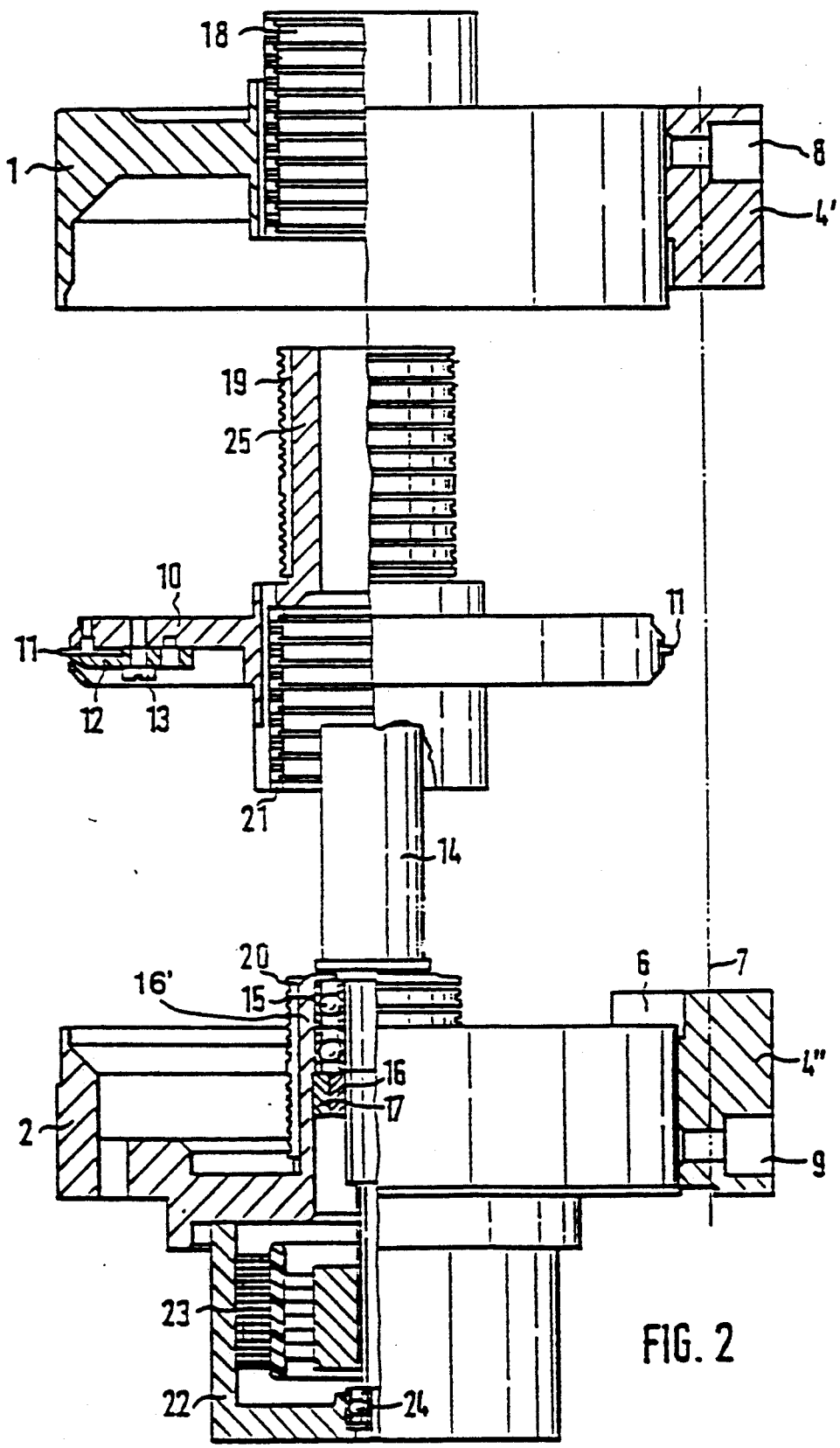

In FIGS. 1 and 2 the same parts are designated with the same reference numerals. The upper drum 1 and the lower drum 2 together constitute a fixed tape guiding drum 3. The upper drum 1 and the lower drum 2 are fixed and aligned coaxially by drum guiding brackets 4' and 4" that are of prismatic shape for circumferential fixation and fit together in a plane at about the height of a separation gap 5 between the upper drum 1 and the lower drum 2. At 6 there is a cavity to accomodate the orbit of the magnetic heads 11 which pass barely through the gap 5 between the drum bodies. The two parts 4' and 4" of the drum bracket are held against the drum bodies at the boundary 7 with the help of screws. Bores 8 and 9 are respectively located in the parts 4' and 4" of the drum bracket and run perpendicularly to the axis of the upper and lower drums, so that screws (not shown in the drawing) can fix both drums 1 and 2 where they fit in a prismatic cavity of the drum brackets 4' and 4" at the boundary 7.

A headwheel disk 10 rotates so that magnetic heads 11 affixed to its periphery revolve in the separation gap 5. The individual magnetic heads 11 are mounted on head carriers 12, which each are affixed to the headwheel disk by a screw 13. The headwheel disk 10 is firmly affixed to a shaft 14 for rotation therewith and that shaft turns in a duplex ball bearing centered at the height of the orbit of the revolving magnetic heads. The duplex ball bearing 15 can for example be a paired ball bearing having two single-row groove-type ball bearings which are held flush together with a compressive force. The inner rings of the duplex ball bearing 15 are secured by a nut 16 and the outer rings likewise by a screw 17.

The transmission of recording, erasing or other a.c. signals takes place over rotary transformers which consist of a stator part in a common stator 18 and a rotor part in a common rotor 19. The rotor 19 is force-fitted to a seating shell 25 for the headwheel disk 10. The stator part 18 is affixed to an inner bore of the upper drum 1. Below the headwheel disk 10 and thus spatially separated from the recording side transformers of the stator and rotor 18, 19 a transformer array for playback signals is disposed in the stator and rotor 20, 21. These playback signals are produced by induction in the scanning of magnetic tape (not shown) by playback magnetic heads among the magnetic heads 11. The transformer arrangement on the playback side consists of a stator part in a common stator 20 and a rotary part in a common stator 21. In contrast to the transformer arrangement above the headwheel 10, the arrangement below the headwheel disk 10 and its support shell 25 has rotary transformers of which not the inner rings but rather the outer rings are mounted in the rotor 21 for rotating with the revolving headwheel disk 10, while the inner rings of the rotary transformers are mounted in the stator 20 which is affixed to an outer wall of the main shaft bearing which is located within the drums 1 and 2. The individual magnetic core rings have grooves either at their inner or outer diameter in which windings of the rotary transformers are embedded. Further description of the magnetic core rings and their embedded windings are described below in connection with FIG. 2.

The special separation of the rotary transformers by the headwheel disk 10 and its supporting shell 25 the subdivision of the signal transfer paths in a closed playback path and in a recording path separate from the former has the advantage that by the shielding effect of the head wheel disk 10 the playback and recording signal transmission paths are decoupled and the signal to noise margin is improved. It is thus possible for tracks recorded with a recording magnetic head to be read by a following playback head to provide a so-called aftercheck of the tape without deterioration of the signal to noise margin of the playback signal by any amount worth mentioning of cross talk from the recording signal. Furthermore this arrangement of the rotary transformers has the advantage that by means of a small air gap dimensioned between the rotor and stator parts there is good magnetic coupling, so that a data transmission rate of about 130 megabits per second is obtained for each of the identically constructed rotary transformers. Moreover the scanning device of the invention is very compact, providing a space saving that additionally makes it possible to provide a duplex ball bearing 15 in the plane of the orbit of the magnetic heads 11, so that thermally caused changes of the shaft length do not affect the height of the orbit of the rotating magnetic heads 11.

A casing 22 is affixed coaxially to the underside of the lower drum 2. In this casing a motor 23 for driving the headwheel 10 is located. This casing 22 also contains a support bearing 24 for the shaft 14. The support bearing 24 can be constructed as a single-row grooved-race ball bearing. It is the function of the support bearing 24 to stabilize the orbit plane of the magnetic heads 11 and if necessary to make a correcting adjustment by shifting the support bearing perpendicularly to the direction of the axis of the shaft 14 for aligning the orbit plane of the rotating magnetic heads 11 with the gap 5 between the drums.

FIG. 2 shows the tape guiding drum 3 split apart into three parts. To the left of the central axis the tape guiding drum 3 is shown in section, and to the right thereof in elevation view. The parts 4' and 4" of the drum bracket are shown in section and likewise a primsmatic portion of the drum halves which fit therein.

The upper part of FIG. 2 shows the upper drum 1 removed from the lower drum, so that the stator part for the playback side signal paths is readily visible. The middle part of FIG. 2 shows the headwheel arrangement with its headwheel disk 10 removed from the shaft 14, together with the seating shell 25, the inner rings mounted in the rotor 19 located above the headwheel disk 10 and, below therefrom, the outer rings mounted in the rotor 21. In the lower part of FIG. 2 the lower drum 2 is shown with the shaft 14, the bearing elements 15, 16, 16; 17 and 14 as well as the motor 23. The shaft 14 is so shaped that the headwheel disk 10 can be driven by the shaft through the seating shell 25.

Each of the fixed parts and the rotary parts of the rotary transformers consists of a winding embedded in an outer magnetic core ring and a concentric winding embedded in an inner magnetic core ring of the same transformer. The rotary transformers located above the headwheel disk have respective stationary windings embedded in outer magnetic core rings, which are parts of the stator 18 fixed in a bore of the fixed upper drum 1 and have respective rotary windings embedded in an inner magnetic core rings which are parts of the rotor 19 fixed on the disk-seating shell 25 of the headwheel disk 10. Conversely, the rotary transformers located below the headwheel disk 16 have respective rotary windings embedded in outer magnetic core rings which are parts of the rotor 21 and respective stationary windings embedded in inner magnetic core rings, which are parts of the stator 20 affixed to a stationary outer wall 16' of a bearing 15–17 for the shaft 14 of the headwheel disk 10. The outer stator 18 and the outer rotor 21 are stacked one above the other on opposite sides of the headwheel disk seating shell 25. The same is true of the inner rotor 19 and the inner stator 20 below it, with the headwheel disk seating shell 25 between them.

Although the invention has been described by reference to particular illustrative example, it will be understood that variations and modifications are possible within the inventive concept.

We claim:

1. A scanning device for a magnetic tape recording and playback apparatus having a composite tape guiding drum consisting of fixed upper and lower drums, having a rotary headwheel disk structure mounted on a shaft and having at least two magnetic heads affixed to the periphery of said headwheel disk structure, at least two rotary transformers being provided for transmission of signals from and to the magnetic heads, including, above the headwheel disk structure, at least one of said rotary transformers and, below the headwheel disk structure, at least one of said rotary transformers, characterized in that said headwheel disk structure (10, 25) includes a disk-seating shell (25), and in that each said rotary transformer consists of an outer magnetic core ring with an embedded winding and an inner magnetic core ring with an embedded winding, said outer magnetic core rings include at least two core rings respectively on opposite sides of said headwheel disk structure (10, 25) and disposed one above the other and said inner magnetic core rings include at least two core rings respectively on opposite sides of said headwheel disk structure (10, 25) and disposed one above the other, said windings of said rotary transformers embedded in said core rings above and below said headwheel disk structure being so connected that said at least one rotary transformer which is above said headwheel disk structure (10, 25) has its said outer magnetic core ring fixed in a bore of said fixed upper drum (1) and has its said inner magnetic core ring fixed on said disk-seating shell (25) of said rotary headwheel disk structure (10, 25), and said at least one rotary transformer which is below said headwheel disk structure (10, 25) has its said outer magnetic core ring affixed to the inner wall of the rotary headwheel disk structure (10, 25) and has its said inner magnetic core ring affixed to an outer wall (16a) of a bearing for the shaft (14) of said rotary headwheel disk structure (10, 25), each said outer magnetic core ring and its embedded winding being uniformly radially adjacent to and concentric with each respective said inner magnetic core ring and its said embedded winding of the same rotary transformer.

2. The scanning device of claim 1, wherein said at least one rotary transformer located on a first side of the rotary headwheel disk structure (10, 25) is connected for transmission of playback signals from at least one playback head which is included in said at least two magnetic heads, while said at least one rotary transformer located on a second side, opposite to said first side, of said rotary headwheel disk structure (10, 25) is connected for transmission of signals other than playback signals from at least one non-playback magnetic head which is included in said at least two magnetic heads.

3. The scanning device of claim 1, wherein respective tips (11) of said at least two magnetic heads (12) affixed to the periphery of said rotary headwheel disk structure define an orbit plane of said magnetic heads and wherein means are provided for coaxially aligning and affixing said upper and lower drums (1, 2) of said composite tape guiding drum (3) which comprise a drum bracket (4', 4") composed of two parts fitting together at the height of the orbit plane of said magnetic heads (12,), said drum bracket having a prismatic surface which fits a prismatic portion of the periphery of said drums, each separate part (4', 4") of said drum bracket being firmly connected respectively to said upper and lower drums in each case by at least one screw connection directed perpendicularly to the direction of the axis of said shaft (14).

4. A scanning device for a magnetic tape recording and playback apparatus having a composite tape guiding drum consisting of fixed upper and lower drums, having a rotary headwheel disk structure mounted on a shaft and having at least four magnetic heads affixed to the periphery of said headwheel disk structure, at least two rotary transformers being provided for transmission of signals from and to the magnetic heads, including at least one of the rotary transformers located above the headwheel disk structure and at least one of said rotary transformers located below the headwheel disk structure, characterized in that said apparatus has at least four said rotary transformers for transmission of signals from and to said magnetic heads, including at least two located below and at least two located above said headwheel disk structure, in that said headwheel disk structure (10, 25) includes a disk-seating shell (25) and in that each said rotary transformer consists of an outer magnetic core ring with an embedded winding and a concentric inner magnetic core ring with an embedded winding, said outer magnetic core rings being provided in respective coaxial groups stacked one above the other on opposite sides of said headwheel disk structure (10, 25) and said inner magnetic core rings being provided in respective coaxial groups stacked one above the other on opposite sides of said headwheel disk structure (10, 25), all said magnetic core rings being disposed and their embedded windings being connected in such a way that said at least two rotary transformers which are located above said headwheel disk structure (10, 25) have their said outer magnetic core rings fixed in a bore of said fixed upper drum (1) and have their said inner magnetic core rings fixed on said disk-seating shell (25) of said rotary headwheel disk structure (10, 25), and said at least two rotary transformers which are located below said headwheel disk structure (10, 25) have their said outer magnetic core rings affixed to an inner wall of the rotary headwheel disk structure (10, 25) and have their said inner magnetic core rings affixed to an outer wall (16') of a bearing for the shaft (14) of said rotary headwheel disk structure (10, 25), each said outer magnetic core ring and its embedded winding being uniformly radially adjacent to and concentric with each respective said inner magnetic core ring and its said embedded winding of the same rotary transformer.

5. The scanning device of claim 4, wherein said at least two rotary transformers located on a first side of the rotary headwheel disk structure (10, 25) are connected for transmission of playback signals from at least two playback head which are included in said at least four magnetic heads, while said at least two rotary transformer located on a second side opposite to said first side, of said rotary headwheel disk structure (10, 25) are connected for transmission of signals other than playback signals from at least two non-playback magnetic heads which are included in said at least four magnetic heads.

6. The scanning device of claim 4, wherein respective tips (11) of said at least four magnetic heads (12) affixed to the periphery of said rotary headwheel disk structure define an orbit plane of said magnetic heads and wherein means are provided for coaxially aligning and affixing said upper and lower drums (1, 2) of said composite tape guiding drum (3) which comprise a drum bracket (4', 4") composed of two parts fitting together at the height of the orbit plane of said magnetic heads (12,), said drum bracket having a prismatic surface which fits a prismatic portion of the periphery of said drums, each separate part (4', 4") of said drum bracket being firmly connected respectively to said upper and lower drums in each case by at least one screw connection directed perpendicularly to the direction of the axis of said shaft (14).

7. The scanning device of claim 4 wherein said rotary transformers are of identical construction and dimensions at least in their magnetic core rings, the windings embedded in said magnetic core rings and the spacing between windings embedded in adjacent outer and inner core rings and between adjacent outer and inner core rings.

* * * * *